(12) United States Patent
Jutras et al.

(10) Patent No.: US 9,124,101 B2
(45) Date of Patent: Sep. 1, 2015

(54) POWER SUPPLY HAVING SELECTABLE OPERATION BASED ON COMMUNICATIONS WITH LOAD

(71) Applicant: BEL FUSE (MACAO COMMERCIAL OFFSHORE) LIMITED, Andar H-K (MO)

(72) Inventors: Mark Jutras, Upton, MA (US); Scott Moore, Westford, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 0 days.

(21) Appl. No.: 14/230,364

(22) Filed: Mar. 31, 2014

(65) Prior Publication Data

US 2014/0292297 A1    Oct. 2, 2014

Related U.S. Application Data

(60) Provisional application No. 61/807,536, filed on Apr. 2, 2013.

(51) Int. Cl.
*H02J 7/00* (2006.01)
*H02M 3/335* (2006.01)

(52) U.S. Cl.
CPC .............. *H02J 7/0004* (2013.01); *H02M 3/335* (2013.01); *H02J 2007/0096* (2013.01); *H02M 3/33523* (2013.01)

(58) Field of Classification Search
CPC ................ H02M 3/156; H02M 3/335; H02M 2001/0019
See application file for complete search history.

(56) References Cited

U.S. PATENT DOCUMENTS

| | | | | |
|---|---|---|---|---|
| 3,484,694 A | * | 12/1969 | Brothman et al. | 455/507 |
| 3,763,466 A | * | 10/1973 | Howard et al. | 340/914 |
| 4,639,714 A | * | 1/1987 | Crowe | 375/259 |
| 4,668,934 A | * | 5/1987 | Shuey | 370/464 |
| 4,680,528 A | | 7/1987 | Mikami et al. | |
| 5,268,666 A | * | 12/1993 | Michel et al. | 340/12.37 |
| 5,408,497 A | * | 4/1995 | Baumann et al. | 375/219 |
| 5,886,508 A | * | 3/1999 | Jutras | 323/267 |
| 6,008,733 A | * | 12/1999 | Okano et al. | 340/3.54 |
| 6,040,778 A | * | 3/2000 | Hopkins et al. | 340/650 |
| 6,115,266 A | * | 9/2000 | Matsui et al. | 363/21.13 |
| 8,306,659 B2 | | 11/2012 | Abramson et al. | |

(Continued)

FOREIGN PATENT DOCUMENTS

EP    0448235 A2    9/1991
EP    1160964 A2    5/2001

*Primary Examiner* — Fred E Finch, III
*Assistant Examiner* — Yusef Ahmed
(74) *Attorney, Agent, or Firm* — BainwoodHuang (57) ABSTRACT

A power supply includes signaling circuitry coupled to output terminals for engaging in bidirectional communications with a load. A controller is capable of conducting the bidirectional communications and selecting among different operating modes for the power supply based on the communications. The modes may include a constant-current mode suitable for applications such as battery charging and power LED lamps, and a constant-voltage mode suitable for a variety of conventional uses such as powering electronic circuitry. The signaling circuitry may include a power switching transistor in series with the load, which is pulsed in a binary fashion to transmit communications to the load. A signal-forming resistor in parallel with the power switching transistor develops a signaling voltage monitored by the controller to receive communications from the load.

16 Claims, 5 Drawing Sheets

(56) References Cited

U.S. PATENT DOCUMENTS

| | | | |
|---|---|---|---|
| 8,374,573 B1* | 2/2013 | Potter, Sr. | 455/345 |
| 8,767,867 B1* | 7/2014 | Castor-Perry | 375/295 |
| 2005/0007082 A1* | 1/2005 | Bretz et al. | 323/274 |
| 2006/0049918 A1* | 3/2006 | Takiguchi | 340/10.4 |
| 2008/0278132 A1* | 11/2008 | Kesterson et al. | 323/283 |
| 2010/0052577 A1* | 3/2010 | Brownlee | 315/362 |
| 2010/0128501 A1* | 5/2010 | Huang et al. | 363/21.16 |
| 2010/0208500 A1* | 8/2010 | Yan et al. | 363/21.12 |
| 2011/0019445 A1* | 1/2011 | Wu et al. | 363/78 |
| 2011/0057573 A1* | 3/2011 | Jutras et al. | 315/185 R |
| 2012/0281438 A1* | 11/2012 | Fang et al. | 363/21.12 |
| 2013/0006418 A1 | 1/2013 | Tian et al. | |
| 2013/0027985 A1* | 1/2013 | Wang et al. | 363/21.01 |
| 2013/0187619 A1* | 7/2013 | Dunipace | 323/225 |
| 2014/0078789 A1* | 3/2014 | Li et al. | 363/21.15 |
| 2014/0160810 A1* | 6/2014 | Zheng | 363/21.17 |
| 2014/0167728 A1* | 6/2014 | Liu | 323/318 |

* cited by examiner

POWER SUPPLY HAVING SELECTABLE OPERATION BASED ON COMMUNICATIONS WITH LOAD

BACKGROUND

The present invention is related to the field of switching power supplies, and in particular to configurable switching power supplies capable of being configured in distinct ways for different applications.

SUMMARY

In a first aspect, a disclosed power supply includes power circuitry configured and operative to provide DC power to a separate load via a pair of conductive terminals, the power circuitry including a power switching transistor in series with the load via one of the terminals, the power switching transistor being closed when the power supply is delivering power to the load. A signal-forming resistor in parallel with the power switching transistor provides a path for signaling current conducted by the load and generates a corresponding signaling voltage when the power switching transistor is open. A controller operates to conduct bidirectional communications with the load via the pair of conductive terminals and generate load-dependent values of configuration parameters of the power supply in response to the communications. The bidirectional communications include (i) in a transmit mode, supplying a pulsed binary control signal to the power switching transistor to convey an outgoing message to the load as a sequence of distinct signaling voltage values across the pair of conductive terminals, and (ii) in a receive mode, maintaining the power switching transistor open and monitoring the signaling voltage to receive incoming messages from the load as a sequence of distinct voltage values developed by the signal-forming resistor in response to corresponding signaling current values generated by signaling action of the load.

The communications may be used for any of a variety of purposes, including for example to enable the load to control the configuration of the power supply. This functionality can enable a power supply to be used in a desired load-specific manner.

In another aspect, a disclosed power supply includes power circuitry configured and operative to provide DC power to a separate load via a pair of conductive terminals, the load being of either a first type requiring a first mode of power delivery or a second type requiring a distinct second mode of power delivery. Communications signaling circuitry is coupled to the load via the pair of conductive terminals for bidirectional communications between the power supply and the load, where the bidirectional communications includes (i) transmitting messages as sequences of binary pulses of signaling voltages detected by the load, and (ii) receiving messages by detecting sequences of binary pulses of signaling current conducted by the load. A controller is configured and operative to conduct the bidirectional communications with the load via the communications signaling circuitry and the pair of conductive terminals and, in response to the bidirectional communications, to (1) select from among a set of two or more power delivery modes for the power supply including at least the first power delivery mode and second power delivery mode, the first power delivery mode being selected when the load has communicated that it is of the first type, and the second power delivery mode being selected when the load has communicated that it is of the second type, and (2) configure the power supply to operate in the selected power delivery mode.

The first and second power delivery modes may be constant-current and constant-voltage modes, respectively, where the constant-current mode is selected based on the load communicating that it is of a corresponding type. In one example the load includes batteries that are charged by the power supply using the constant-current operating mode. The communications signaling circuitry may be implemented in a variety of manners, including switching of a power switching transistor in series with the load. The controller may implement protection by selectively opening the transistor when excessive load current is detected.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

A power supply has features for communicating with a load and for adjusting aspects of its own operation, such as output voltage and current, based on communications with the load. The power supply is especially tailored for applications with constant-current loads, such as battery charging or powering light-emitting diode (LED) lamps.

Figure 1:
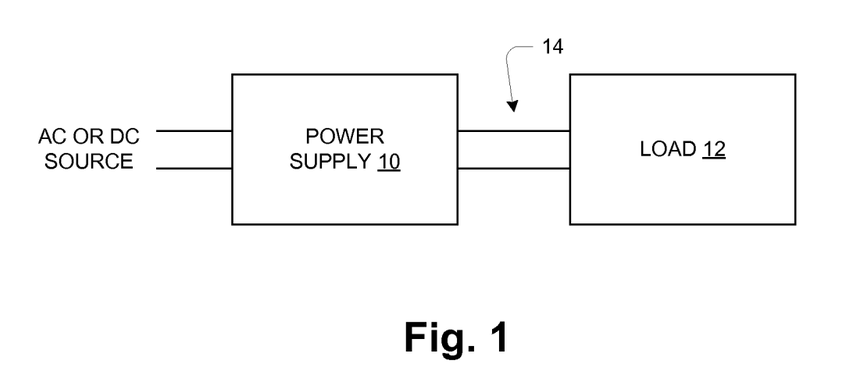
FIG. 1 is a block diagram of an electrical system.

FIG. 1 shows a system environment. A power supply 10 receives electrical energy from an AC or DC source, such as mains power, a high-power system level supply, etc. The power supply 10 is connected to a load 12 via connections 14. The power supply 10 provides DC power to the load 12 via the connections 14, and as further described below the connections 14 are also used for two-way communications between the power supply 10 and load 12. In one embodiment, the power supply 10 is capable of different modes of operating, and further capable to select a given operating mode in response to communications received from the load 12. This functionality enables the power supply 10 to have a more general design that may be used in a variety of applications. When used in a given application, the power supply 10 receives communications via the connections 14 (from either a load such as load 12 or some other device capable of engaging in the required communications) that causes control circuitry within the power supply 10 to configure the power supply 10 to operate in a corresponding application-specific manner. Examples are described below.

In one embodiment, the power supply 10 and load 12 are in distinct physical enclosures and the connections 14 are carried by a connector having specified mechanical and electrical characteristics. In particular, in one application the load 12 is a mobile electromechanical device such as a robotic appliance that operates on rechargeable batteries and is capable of roaming independently for performing a task, then docking with the power supply 10 to recharge its batteries when the appliance is not in use. In one configuration, the connections 14 are formed by conductive contacts located on outer surfaces of the power supply 10 and the robotic appliance. The contacts make physical and electrical contact with each other when the robotic appliance is docked, and charging current and communications signals are then delivered via the contacts.

Operation of the power supply is now briefly described. Operation includes two specific aspects, namely communications and configuration functionality as well as protection functionality.

The load 12 communicates with the power supply 10 to enable the load 12 to effectively control the charging mode voltage and current of the power supply 10. Initially, the load 12 presents an impedance that is much larger than would normally be present during regular operation (e.g., larger than the relatively low impedance of a battery in a charging application). The power supply 10 detects this non-zero, high-impedance load and enters a communication mode. While in communication mode, the power supply 10 monitors the voltage at the VX point with respect to the secondary side ground. The load 12 transmits messages to the power supply 10 by switching off and on an internal communication resistor to represent logic 0 and 1 values. The power supply 10 interprets a sequence of these pulses as a message. Similarly, the power supply 10 asynchronously transmits messages to the load 12 by closing and opening an internal switch, providing pulses corresponding to logic 0 and 1 values. The load 12 interprets a sequence of these pulses as a message. Example circuitry and other details are provided below.

Once communication is complete, the power supply 10 uses the contents of the received message(s) to configure itself accordingly. A specific example is described below in which the power supply 10 is capable of either constant-current operation or constant-voltage operation. The latter is typical of many applications in which output power is provided in the form of a predetermined constant output voltage and a generally variable current drawn by the load. In contrast, constant-current operation provides a predetermined current at a generally variable voltage. Constant-current operation is useful in certain applications including battery charging and powering LED lamps. Thus in a battery charging application such as described above (battery powered robotic device), after completion of communication the power supply 10 enters a constant-current charging mode.

Another aspect of operation is protection, which may have both internal and external aspects. The internal aspect is to protect against damage to internal components such as the switch Q1 by detecting certain fault conditions and responding accordingly, e.g., opening the switch Q1 to interrupt current. There may also be conditions in which dangerous external arcing might occur absent suitable protection, and the protection circuitry addresses this aspect as well. Additional details regarding protection are given below.

Figure 2:
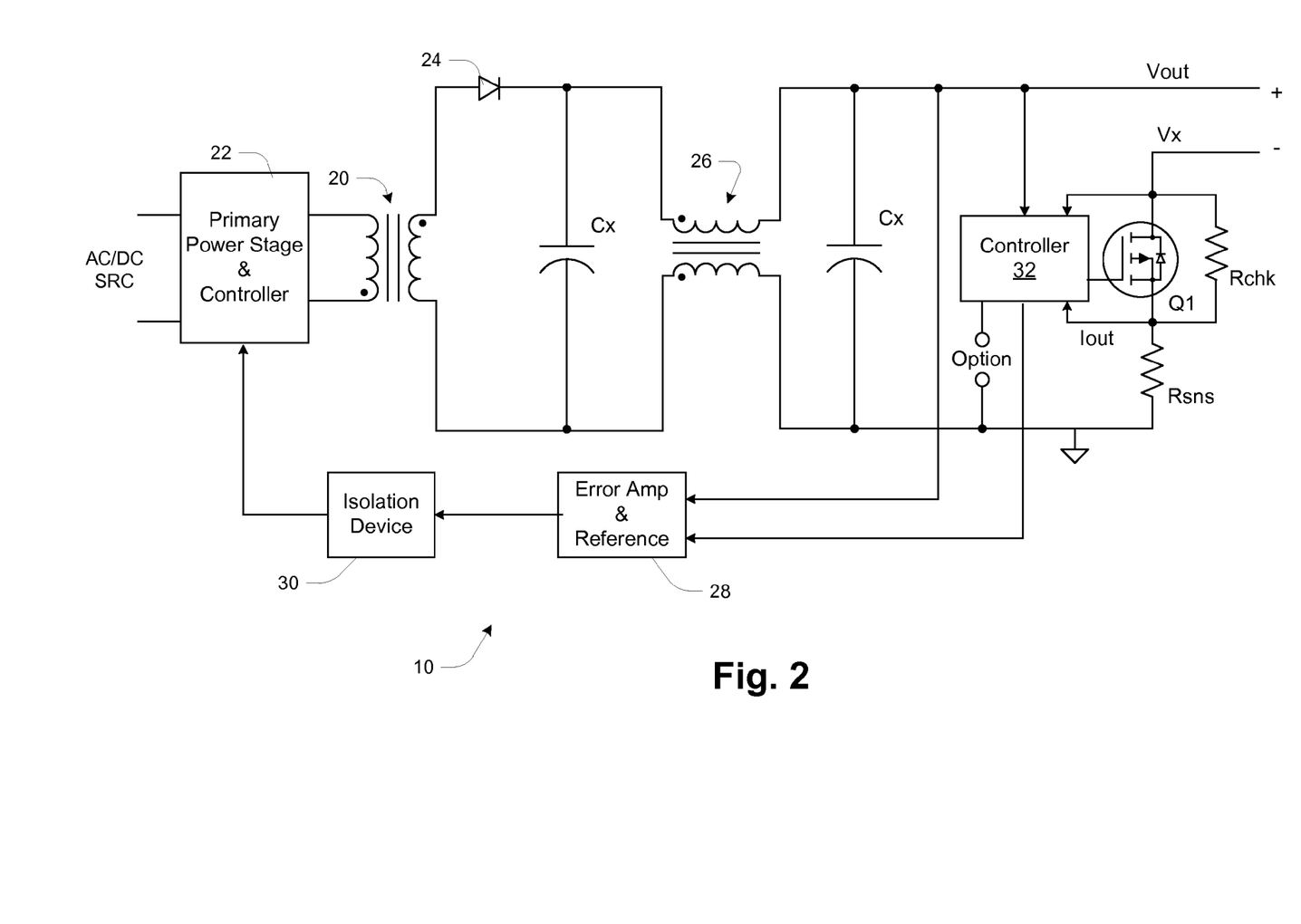
FIG. 2 is a schematic diagrams of a power supply.

FIG. 2 is an electrical schematic diagram of the power supply 10. It includes a power transformer 20 having DC-isolated primary and secondary sides. On the primary side is a primary power stage and controller 22 that receives the system-level input voltage (AC or DC) and generates AC in the transformer 20. The secondary side includes a rectifying diode 24, filter capacitors Cx and a filtering transformer 26 through which DC output current flows to the separate load via terminals shown as "+" and "−". An error amplifier and reference circuit 28 generates a feedback signal sent from the secondary side to the primary power stage and controller 22 via an isolation device 30 such as an opto-isolator.

The secondary side contains additional circuitry including a protection switch Q1 in the form of a power field-effect transistor (FET), a current sense resistor Rsns in series with the load, and a multi-purpose resistor Rchk. A secondary side controller 32 performs a variety of control functions which include controlling operation of the switch Q1 and modifying operation of the primary side via the error amplifier and reference circuit 28. The controller 32 receives a signal Iout from the sense resistor Rsns as an indication of a level of output current. It also receives the output voltages Vout (+) and Vx (−).

Figure 3:
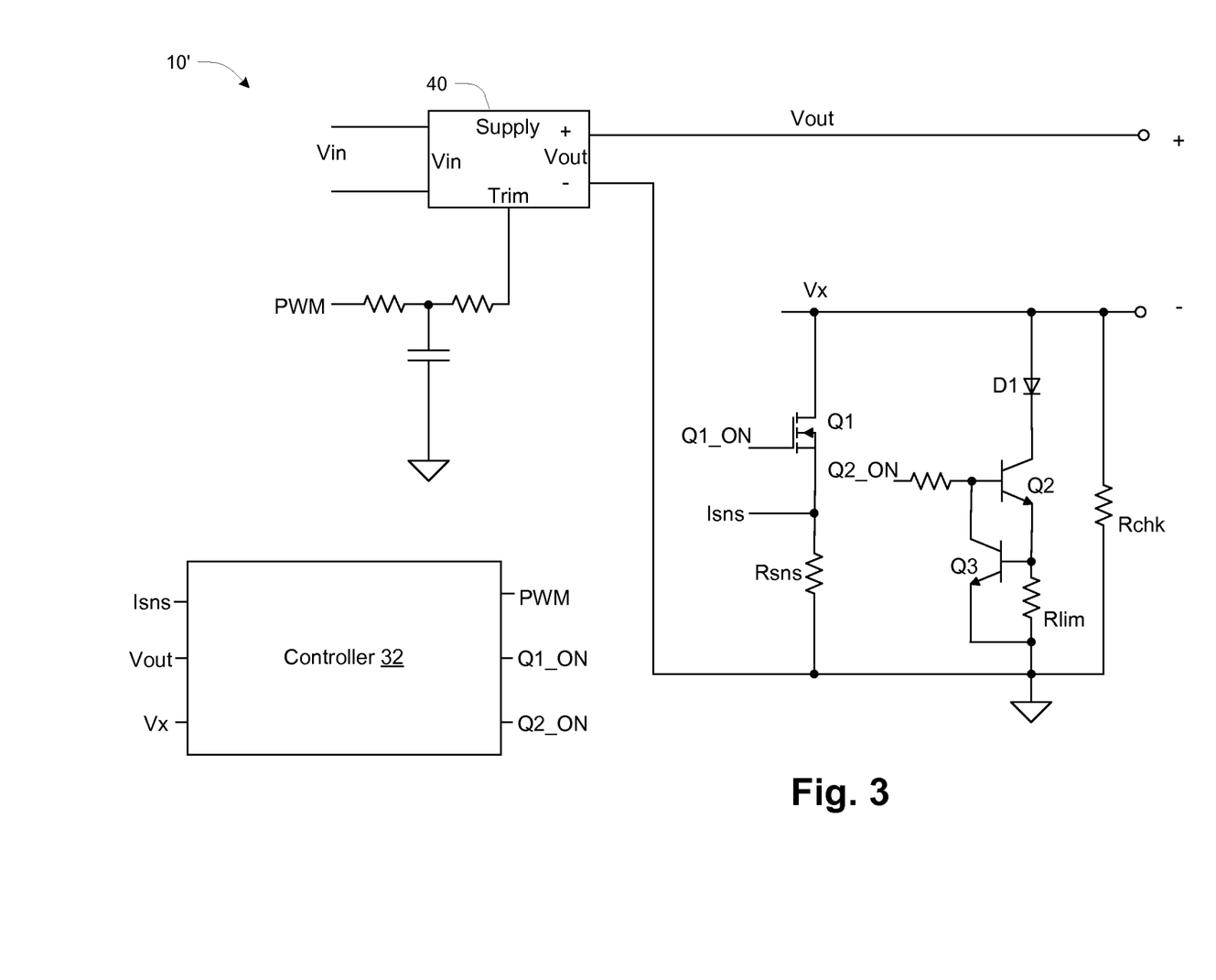
FIG. 3 is a part-block, part-schematic diagram of a power supply.

FIG. 3 is a schematic diagram of a power supply 10' at a somewhat higher level and also having additional secondary side circuitry. The basic power supply circuitry such as primary power stage, transformers, filter capacitors, etc. are represented by a component labelled Supply 40. The controller 32 is shown as a separate component, as well as the circuitry at the output such as switch Q1 and transistors Rchk and Rsns. As shown, this output section also includes a second circuit made up of switches Q2 and Q3, diode D1, and resistors including a limit resistor Rlim. The above description of operation of the supply 10 is also applicable to the supply 10'.

The power supply 10' has an analog trim function (controlled via an external connection TRIM) that sets the power supply output voltage over a specific range by application of a trim voltage. This trim voltage is established by filtering a digital PWM signal generated by the controller 32. The controller 32 also monitors Vout, Vx, and Isns via respective analog-to-digital (ADC) inputs, and controls Q1 and Q2 using signals Q1_ON and Q2_ON.

Regarding the trim function, the controller 32 executing firmware can control the output voltage of the supply by calculating a difference between Vout and Vx and adjusting the duty cycle of the PWM signal to drive the difference to a desired value. This is a constant voltage mode of operation. The controller firmware can alternatively control output current by monitoring the Isns signal (proportional to output current) and adjusting the PWM signal so that the supply generates an output voltage that results in a desired output current through Rsns. This is a constant current mode of operation. The controller firmware can decide based on a desired algorithm whether to control current or voltage in described manner. These algorithms can be used to establish different charging conditions for various battery chemistries, for example. Algorithms can also be implemented to control the current and voltage for a load 12 in the form of a string of LED lamps. The controller 32 can decide when to turn on/off Q1 and/or Q2 based on these algorithms.

Prior to the application of load, Q1 and Q2 are off, and the output voltage rises to a high open-circuit value. When a load is applied, outrush current is limited by Rchk, which can be sized to limit arcing across the output terminals. In one embodiment Rchk has a value of 3.9 Kohms. It will be appreciated that having such a suitable value, Rchk can play two distinct roles—limiting outrush current upon initial application of the load 12, and developing appropriate levels of the voltage Vx in response to the signaling switching of the load to enable the controller 32 to receive communications from the load 12.

When Q1 is on and the voltage across Rsns is very low, indicating a light load, it may not be possible to determine load presence due to insufficient resolution of the ADC within the controller 32 for the Isns signal. In this case, the controller 32 can turn Q2 on and Q1 off. If a light load is present, current will flow through D1 and Q2, and the voltage drop across these devices can be monitored at the Vx node. If load is completely removed the voltage Vx drops to near zero because there is no current to bias D1 and Q2. If this condition is detected the controller 32 can then turn off Q2 and Q1 in preparation of establishing a future non-arcing connection. The controller 32 can also use this condition as a signal to wait for external communication.

The controller may implement protection against short circuits when Q1 is on. It should be noted that it is important to distinguish between the fault condition of a short circuit and the normal condition of providing charging current to a heavily discharged battery. This can be done by monitoring the output voltage Vx. As long as it stays below a certain threshold, it is inferred that operation is normal. Once Vx rises above that threshold, then it can be inferred that a short circuit is occurring. The value for the threshold may vary in different embodiment; in one example it is 2.5 V. Also, it may be desirable to include a brief waiting period after first detecting the above-threshold Vx and then a second sampling. If Vx remains too high, then the short circuit fault condition can be declared, whereas otherwise it is not. In this way, very brief transitory spikes of output current are tolerated and do not trigger a fault.

Figure 4:
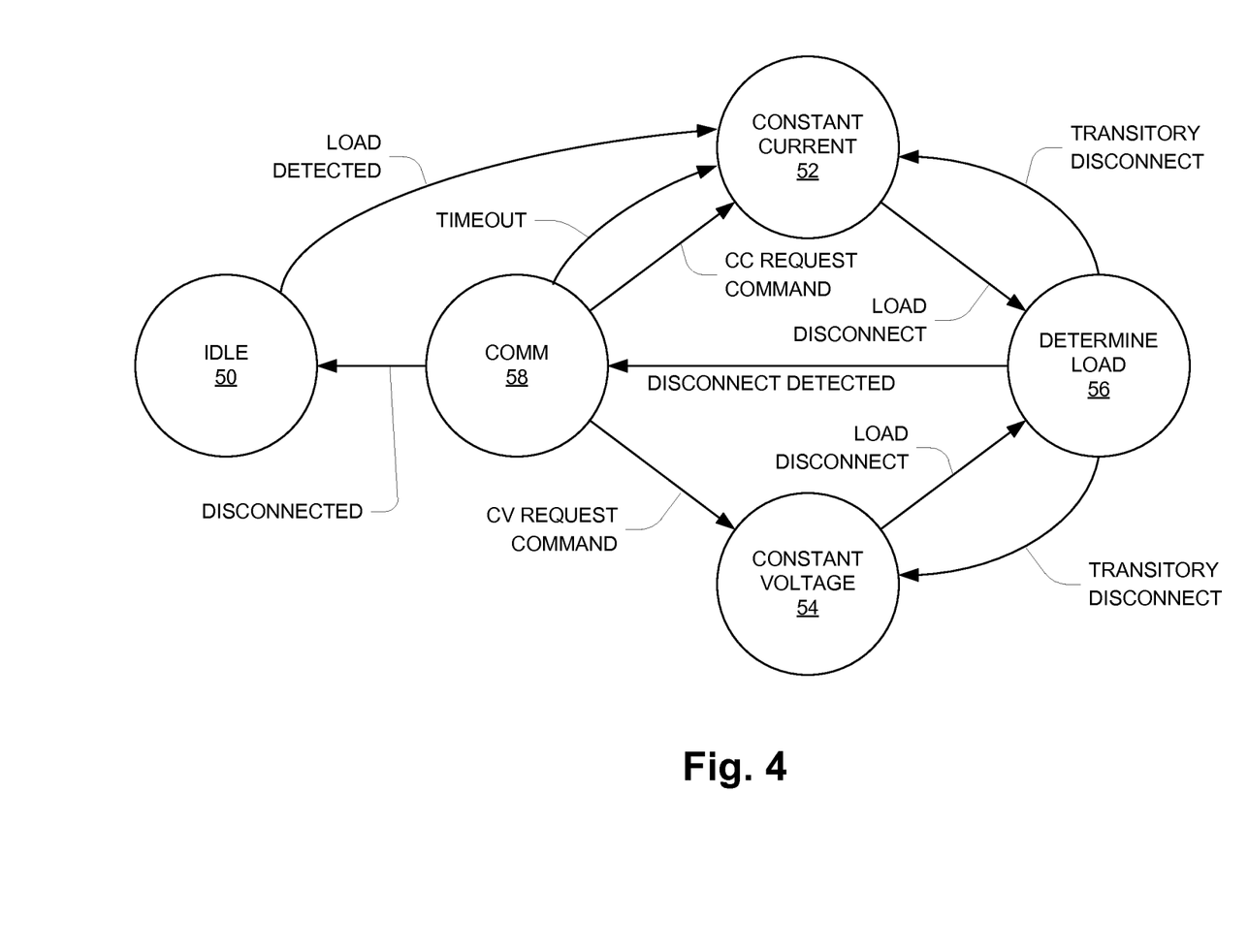
FIG. 4 is a state diagram.

FIG. 4 and Table 1 below provide a specific example of control operation of the controller 32. FIG. 4 shows operating states or modes as Idle 50, Constant Current 52, Constant Voltage 54, Determine Load 56, and Communication 58. Table 1 summarizes state transitions as well as operating conditions in each state. The table presents values for various operating parameters for an embodiment providing a nominal output voltage Vout of 12 VDC and a power rating of 40 W. Those skilled in the art will appreciate how the parameters can be adjusted based on other characteristics of the power supply 10 and load 12.

The transitions from either mode 52 or 54 into Determine Load 56 are shown as "load disconnect" in FIG. 4 and with the term "minimum dwell" in Table 1. Disconnect is inferred from a correspondingly low value of load current; specific examples are given below. The "minimum dwell" signifies that a predetermined period (e.g., 1.5 seconds) is allowed to pass after entering the state before sampling the output current. The transitions in the other direction (from Determine Load 56 to either mode 52 or 54) occur when load current is reestablished and it is inferred that the disconnect was accidental or transitory. The transition to Communication 58 is based on the load current being less than 100 mA for some predetermined period such as 2 seconds. The transition from Communication back to Idle occurs when load current drops below 0.5 mA. The transition from Communication to the default mode (Constant Current in this case) occurs when a timeout (e.g., 5 seconds) elapses without receiving any communication from the load.

Table 2 presents values for various operating parameters according to one embodiment. These may be suitable for the above-described 12 V, 40 W power supply.

TABLE 2

| Parameter | Value | Notes |
| --- | --- | --- |
| Load detection | 0.5-2.5 mA | 8 k to 40 k impedance |
| Input logic 0 | 2.5 mA | 3 k nominal impedance |
| Input logic 1 | 0.5 mA | 15 k nominal impedance |
| Output logic 0 | 12 V | |
| Output logic 1 | 7.5 V | |

TABLE 1

| State | Description | Switch Q2 | Switch Q1 | Output Voltage/ Current | Transition Condition | Next State |
| --- | --- | --- | --- | --- | --- | --- |
| Idle | Wait for load to connect | Open | Open | 19 V (open ckt.) | Detect load (<50 k) | Default Mode |
| Constant Current Mode | Maintain constant output current | Closed | Open | Constant specified current | Drop in output current (min. dwell) | Determine Load |
| Constant Voltage Mode | Maintain constant output voltage | Closed | Open | Constant specified voltage | Drop in output current (min. dwell) | Determine Load |
| Determine Load | Sense if accidental or transitory disconnect or if load wants to enter Comm. Mode | Open | Closed | 8 V to 18 V | Load >100 mA and was in Constant Current Mode | Constant Current |
| | | | | | Load >100 mA and was in Constant Voltage Mode | Constant Voltage |
| | | | | | Load <100 mA (non-transient) | Communication |
| Communication | Receive and respond to messages from load | Open | Open | 7.5 V | No load (>100 k) or Idle Command | Idle |
| | | | | | (a) Constant Current Request Command or (b) No communication within timeout | Constant Current Mode |
| | | | | | Constant Voltage Request Command | Constant Voltage Mode |

The transition out of Idle is shown in Table 1 as entering a default mode. In the example of FIG. 4, the default operating mode is the constant current mode 52. In other embodiments some other default operating mode may be used.

TABLE 2-continued

| Parameter | Value | Notes |
| --- | --- | --- |
| Bit rate | 75 Baud | |

TABLE 2-continued

| Parameter | Value | Notes |
|---|---|---|
| Message timeout | 0.25 S | Timeout for gap between stop bit and next start bit (error) |
| Mode Timeout | 5.0 S | Timeout for awaiting load communication before entering default mode |

As mentioned above, the ability of the power supply 10 to self-configure based on communications it receives via the output terminals enables the power supply 10 to have a more general design that may be used in a variety of applications. When used in a given application, the power supply 10 receives communications via the connections 14 (from either a load such as load 12 or some other device capable of engaging in the required communications) that causes control circuitry within the power supply 10 to configure the power supply 10 to operate in a corresponding application-specific manner. This type of operation is usable even if the power supply is implemented in a completely sealed manner, such as by encapsulation, as is required for certain applications. It is not necessary to set mechanical switches or jumpers to achieve a desired configuration. The power supply 10 can be stocked in quantity, and for a given application a manufacturer or distributor may employ a programming device to connect to the supply via the output terminals and send application-specific communications to the supply to enable it to self-configure as necessary.

Figure 5:
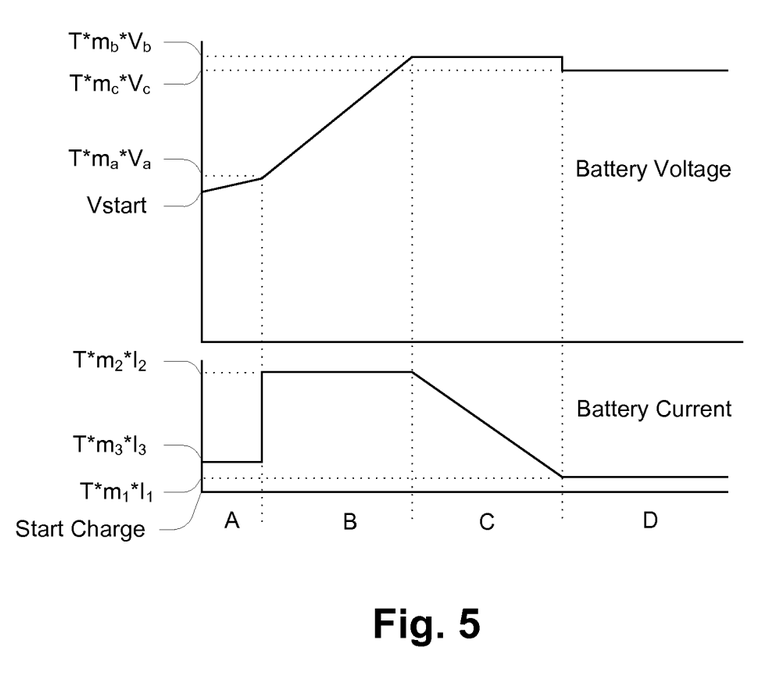
FIG. 5 is a waveform diagram for voltage and current during charging.

FIG. 5 illustrates a use of the disclosed communications technique. In this example, a single charging operation includes 4 sequential modes of operating, shown as A, B, C and D. The load 12 has communicated specific charging requirements specific to its battery chemistry and capacity, and the power supply 10 sets up parameters for the various charging modes accordingly. In this example, mode A provides a first constant current value until the output voltage reaches a defined voltage level. In mode B a different constant current value is provided until the output reaches a second defined voltage level. Mode C is a constant-voltage mode providing a constant voltage level until the output current tapers to a defined value, and mode D is a final constant voltage level. The charge parameters may be communicated to include some or all of these modes, and it is also is possible that in Mode D the power switch (Q1) is shut off to remove charging voltage. With configuration by way of communication, the power supply 10 can accommodate charging curves for potentially a large number of distinct battery chemistries.

While various embodiments of the invention have been particularly shown and described, it will be understood by those skilled in the art that various changes in form and details may be made therein without departing from the scope of the invention as defined by the appended claims.

What is claimed is:

1. A power supply, comprising:
power circuitry configured and operative to provide DC power to a separate load via a pair of conductive terminals, the power circuitry including a power switching transistor in series with the load via one of the terminals, the power switching transistor being closed when the power supply is delivering power to the load;
a signal-forming resistor in parallel with the power switching transistor providing a path for signaling current conducted by the load and generating a corresponding signaling voltage when the power switching transistor is open; and
a controller configured and operative to conduct bidirectional communications with the load via the pair of conductive terminals and to generate load-dependent values of configuration parameters of the power supply in response to the communications, the bidirectional communications including (i) in a transmit mode, supplying a pulsed binary control signal to the power switching transistor to convey an outgoing message to the load as a sequence of distinct signaling voltage values across the pair of conductive terminals, and (ii) in a receive mode, maintaining the power switching transistor open and monitoring the signaling voltage to receive incoming messages from the load as a sequence of distinct voltage values developed by the signal-forming resistor in response to corresponding signaling current values generated by signaling action of the load.

2. The power supply according to claim 1, wherein the load is one of a plurality of types of load for which corresponding distinct operating modes of the power supply are required, and wherein the load-dependent configuration parameters reflect selection among the distinct operating modes of the power supply based on the communications with the load indicating that the load has a given type.

3. The power supply according to claim 2, wherein the distinct operating modes include a constant-voltage mode and a constant-current mode, the constant-voltage mode maintaining a predetermined constant value of the output voltage over a range of values of the output current, the constant-current mode maintaining a predetermined constant value of the output current over a range of values of the output voltage.

4. The power supply according to claim 1, wherein the power circuitry includes primary-side power switching circuitry operable at a variable duty cycle according to a control signal received from the controller via a DC-isolating device, variation of the duty cycle causing corresponding variation of the output voltage and/or output current of the power supply, and wherein the controller is a secondary-side controller having the output voltage DC coupled thereto as a sensing voltage and performs constant-voltage operation in which the controller generates the control signal in a manner maintaining a constant value of the output voltage as represented by the sensing voltage, and wherein the load-dependent values of the configuration parameters generated in response to the communications with the load establish the constant value of the output voltage maintained by the controller.

5. The power supply according to claim 1, wherein the power circuitry includes primary-side power switching circuitry operable at a variable duty cycle according to a control signal received from the controller via a DC-isolating device, variation of the duty cycle causing corresponding variation of the output voltage and/or output current of the power supply, and wherein the controller is a secondary-side controller having a current-sense signal DC coupled thereto, the current-sense signal developed directly from output current of the power supply flowing through the power switching transistor, the controller performing constant-current operation in which the controller generates the control signal in a manner maintaining a constant value of the output current as represented by the current-sense signal, and wherein the load-dependent values of the configuration parameters generated in response to the communications with the load establish the constant value of the output current maintained by the controller.

6. The power supply according to claim 5, wherein the controller is configured and operative when the power switching transistor is closed to sense presence of the load by a sufficiently high value of the current-sense signal, and the power circuitry further includes a secondary switching circuit capable of providing current to a sufficiently light load and generating a higher value of the output voltage than is generated when the first switching transistor is closed, and the controller is configured and operative to turn off the power switching transistor and to turn on the secondary switching circuit to monitor for presence of the load as a sufficiently high value of the output voltage under light loading conditions.

7. The power supply according to claim 1, wherein at a time of connection of the load the power supply has a maximum output voltage, and wherein the signal-forming resistor has a resistance value that limits the outrush current to substantially less than a maximum current that the power supply can provide.

8. The power supply according to claim 1, wherein the controller is further configured and operative to provide protection against a short circuit of the output terminals by (a) when supplying power to the load, monitoring for a value of the output voltage greater than a threshold value corresponding to a maximum permissible output current, and (b) upon detecting that the value of the output voltage exceeds the threshold value, turning off the power switching transistor to prevent flow of output current.

9. A power supply, comprising:
power circuitry configured and operative to provide DC power to a separate load via a pair of conductive terminals, the load being of either a first type requiring a first mode of power delivery or a second type requiring a distinct second mode of power delivery;
communications signaling circuitry coupled to the load via the pair of conductive terminals for bidirectional communications between the power supply and the load, the bidirectional communications including (i) transmitting messages as sequences of binary pulses of signaling voltages detected by the load, and (ii) receiving messages by detecting sequences of binary pulses of signaling current conducted by the load; and
a controller configured and operative to conduct bidirectional communications with the load via the communications signaling circuitry and the pair of conductive terminals and, in response to the bidirectional communications, to (1) select from among a set of two or more power delivery modes for the power supply including at least the first power delivery mode and second power delivery mode, the first power delivery mode being selected when the load has communicated that it is of the first type, and the second power delivery mode being selected when the load has communicated that it is of the second type, and (2) configure the power supply to operate in the selected power delivery mode,
wherein the power circuitry includes a power switching transistor in series with the load via one of the terminals, the power switching transistor being closed when the power supply is delivering power to the load,
and wherein the communications signaling circuitry includes a signal-forming resistor in parallel with the power switching transistor providing a path for signaling current conducted by the load and generating a corresponding signaling voltage when the power switching transistor is open.

10. The power supply according to claim 9, wherein the first and second power delivery modes are a constant-current mode and a constant-voltage mode respectively, the constant-current mode providing a constant value of the output current over a range of values of the output voltage, the constant-voltage mode providing a constant value of the output voltage over a range of values of the output current, and wherein the first type includes a rechargeable battery type requiring the constant-current mode of operation of the power supply.

11. The power supply according to claim 9, wherein the load regularly disconnects from and re-connects to the power supply over a normal operating period, and wherein the controller is further configured and operative according to a sequence of operating states including an idle state, a power-delivery state, a load-determining state, and a communication state, the controller transitioning among operating states based on detecting connection and disconnection of the load as well as on communication with the load in the communication state.

12. The power supply according to claim 9, wherein the controller conducts the bidirectional communications with the load by (i) in a transmit mode, supplying a pulsed binary control signal to the power switching transistor to convey an outgoing message to the load as a sequence of distinct signaling voltage values across the pair of conductive terminals, and (ii) in a receive mode, maintaining the power switching transistor open and monitoring the signaling voltage to receive incoming messages from the load as a sequence of distinct voltage values developed by the signal-forming resistor in response to corresponding signaling current values generated by signaling action of the load.

13. The power supply according to claim 12, wherein the controller is further configured and operative to provide protection against a short circuit of the output terminals by (a) when supplying power to the load, monitoring for a value of the output voltage greater than a threshold value corresponding to a maximum permissible output current, and (b) upon detecting that the value of the output voltage exceeds the threshold value, turning off the power switching transistor to prevent flow of output current.

14. The power supply according to claim 9, wherein the first type for the load is a battery type requiring charging by the power supply according to a multi-step charging cycle, and wherein the first power delivery mode is a first one of a sequence of power delivery modes used in respective steps of the charging cycle, and wherein the communications from load specifies charge parameters for one or more of the sequence of power delivery modes, and wherein the controller is further configured and operative to operate the power supply according to the sequence of power delivery modes to effect the multi-step charging cycle for the load.

15. The power supply according to claim 14, wherein the sequence of power delivery modes includes at least one constant-current power delivery mode followed by at least one constant-voltage power delivery mode.

16. The power supply according to claim 15, wherein during a final constant-voltage power delivery mode the power switch is open.

* * * * *